United States Patent
Juriga

(10) Patent No.: US 8,490,992 B2
(45) Date of Patent: Jul. 23, 2013

(54) DUAL LEAF VEHICLE SUSPENSION WITH J-SHAPED SPRING ELEMENT

(75) Inventor: James Andrew Juriga, Franklin, MI (US)

(73) Assignee: Rassini, S.A. de C.V. (MX)

( * ) Notice: Subject to any disclaimer, the term of this patent is extended or adjusted under 35 U.S.C. 154(b) by 57 days.

(21) Appl. No.: 12/990,612

(22) PCT Filed: May 4, 2009

(86) PCT No.: PCT/US2009/002782
§ 371 (c)(1),
(2), (4) Date: Mar. 2, 2011

(87) PCT Pub. No.: WO2009/139829
PCT Pub. Date: Nov. 19, 2009

(65) Prior Publication Data
US 2011/0140388 A1    Jun. 16, 2011

Related U.S. Application Data

(60) Provisional application No. 61/126,426, filed on May 2, 2008.

(51) Int. Cl.
*B60G 11/46* (2006.01)
(52) U.S. Cl.
USPC ................................. 280/124.163
(58) Field of Classification Search
USPC .............. 280/124.163, 124.17, 124.174, 680, 280/686; 267/36.1, 44, 45, 52
See application file for complete search history.

(56) References Cited

U.S. PATENT DOCUMENTS

| | | | | |
|---|---|---|---|---|
| 251,274 | A | * | 12/1881 | Norton ......................... 267/36.1 |
| 1,086,182 | A | * | 2/1914 | Jackson ........................... 267/43 |
| 2,632,639 | A | * | 3/1953 | Proske ............................. 267/28 |
| 2,791,419 | A | | 5/1957 | Whelen |

(Continued)

FOREIGN PATENT DOCUMENTS

| GB | 855805 | 12/1960 |
|---|---|---|
| JP | H05-096926 | 4/1993 |

(Continued)

OTHER PUBLICATIONS

International Search Report for PCT/US2009/002782 dated Dec. 8, 2009.

(Continued)

*Primary Examiner* — Joseph Rocca
*Assistant Examiner* — Robert A Coker
(74) *Attorney, Agent, or Firm* — Cantor Colburn LLP

(57) ABSTRACT

A vehicle suspension arrangement for a vehicle of the type having a chassis rail and a longitudinal axle arranged substantially orthogonal to the chassis rail has a primary spring with a predetermined resilience characteristic coupled to the chassis of the vehicle and to the longitudinal axle. A primary leaf spring is pivotally coupled to the chassis of the vehicle at first and second ends, and an axle coupler portion is arranged intermediate of the first and second ends. A secondary leaf spring has a first end for pivotally coupling to the chassis of the vehicle, and a second end for coupling to the axle. A deflection limiting element is coupled to a selectable one of the primary and secondary leaf springs for controlling a distance therebetween. The deflection limiting element is configured as a J-shaped spring element.

14 Claims, 5 Drawing Sheets

U.S. PATENT DOCUMENTS

| | | | |
|---|---|---|---|
| 2,826,407 A * | 3/1958 | Scheublein, Jr. et al. | 267/45 |
| 2,969,230 A | 1/1961 | Scheublein et al. | |
| 3,038,715 A * | 6/1962 | Davidson et al. | 267/233 |
| 3,305,230 A | 2/1967 | Musser | |
| 3,312,459 A * | 4/1967 | Pence | 267/45 |
| 3,462,169 A | 8/1969 | Carter | |
| 3,850,444 A * | 11/1974 | Wright et al. | 280/124.165 |
| 4,282,945 A | 8/1981 | Bessey | |
| 4,982,972 A * | 1/1991 | Preston et al. | 280/6.16 |
| 5,024,463 A * | 6/1991 | Oliver et al. | 280/6.157 |
| 5,029,893 A | 7/1991 | Walton et al. | |
| 5,046,752 A | 9/1991 | Stephens et al. | |
| 5,137,300 A * | 8/1992 | Walton | 280/5.503 |
| 2005/0269796 A1 | 12/2005 | Sawarynski et al. | |

FOREIGN PATENT DOCUMENTS

| | | |
|---|---|---|
| WO | 2006/121438 A2 | 11/2006 |
| WO | 2007/149442 A2 | 12/2007 |
| WO | WO 2007149442 A2 * | 12/2007 |

OTHER PUBLICATIONS

European Search Report; European Application No. 09746918.3; European Filing Date: May 4, 2009; Date of Mailing: Apr. 4, 2012; 13 pages.

English Translation of Notification of Reasons for Rejection dated Oct. 30, 2012 regarding JP App. No. 2011-507492; 3 pgs.

* cited by examiner

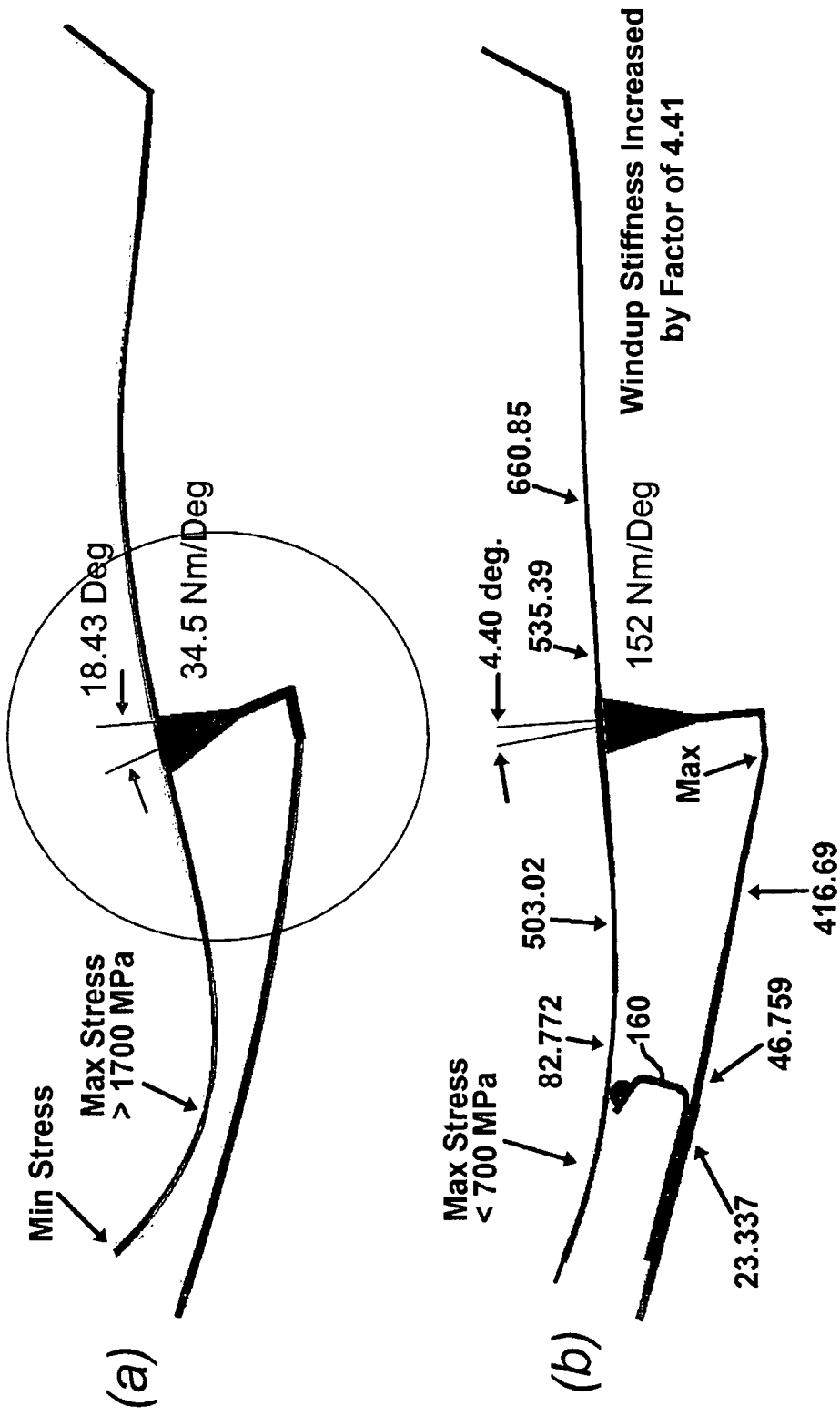

DUAL LEAF VEHICLE SUSPENSION WITH J-SHAPED SPRING ELEMENT

This application claims the benefit of International Application Serial No. PCT/US2009/002782 filed May 4, 2009, which claims the benefit of Provisional Patent Application Ser. No. 61/126,426 filed May 2, 2008, the disclosure of each are incorporated herein by reference.

FIELD OF THE INVENTION

This invention relates generally to suspension systems for vehicles, and more particularly, to a leaf suspension arrangement that employs a dual leaf suspension with a main spring deformation reduction element disposed therebetween on a substantially "J" or "L" shaped spring support element.

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one other to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One prior art effort to address the problems associated with the Hotchkiss system employs a parallel leaf spring arrangement at each end of a solid axle. This known arrangement affords increased axle control, in the form of reduced power hop. Other advantages of this known arrangement include roll under steer, auto load leveling and the gross vehicle weight, and no frame changes are required to convert from a Hotchkiss system. However, the known parallel leaf spring arrangement employs a solid axle, and therefore does not provide the benefits of independent suspension. In addition, this known arrangement is plagued with the disadvantage of high unsprung mass.

A de Dion tube vehicle suspension arrangement is a known form of semi-independent suspension and constitutes an improvement over the Hotchkiss drive. In this type of suspension, universal joints are employed at the wheel hubs and the differential, and there is additionally provided a solid tubular beam that maintains the opposing wheels in parallel. The de Dion tube is not directly connected to the chassis and is not intended to flex.

The benefits of a de Dion suspension include a reduction in the unsprung weight compared to the Hotchkiss drive. This is achieved by coupling the differential to the chassis. In addition, there are no camber changes during suspension unloading. Since the camber of both wheels is set at zero degrees, the traction from wide tires is improved, and wheel hop under high power operations is reduced compared to an independent suspension. However, the de Dion tube adds unsprung weight.

It is, therefore, an object of this invention to provide a vehicle suspension arrangement that provides the benefits of independent suspension while using leaf spring technology.

It is another object of this invention to provide a vehicle suspension arrangement that employs leaf spring technology and yet affords reduced unsprung mass for reduced inertial effects and improved vehicle handling response.

It is also an object of this invention to provide a vehicle suspension arrangement that employs leaf spring technology and affords reduced suspension inertia.

It is a further object of this invention to provide a vehicle suspension arrangement that employs leaf spring technology and affords reduced noise, vibration, and harshness (NVH).

It is additionally an object of this invention to provide a vehicle suspension arrangement that employs leaf spring technology and affords reduced lateral wheel shake.

It is yet a further object of this invention to provide a vehicle suspension arrangement that employs leaf spring technology and affords reduced side view wind-up at the axle bracket.

It is also another object of this invention to provide a vehicle suspension arrangement that employs leaf spring technology and affords reduced forward and rearward movement.

It is yet an additional object of this invention to provide a vehicle suspension arrangement that employs leaf spring technology and affords a semi-independent suspension effect during asymmetric wheel travel.

It is yet an additional object of this invention to provide a vehicle suspension arrangement that employs leaf spring technology in combination with a coil spring element.

SUMMARY OF THE INVENTION

The foregoing and other objects are achieved by this invention which provides a vehicle suspension arrangement for a vehicle of the type having a chassis rail and a longitudinal axle arranged substantially orthogonal to the chassis rail, the vehicle suspension arrangement. In accordance with a first apparatus aspect of the invention, there is provided a primary leaf spring that has a plan view longitudinal configuration, a first end for pivotally coupling to the chassis of the vehicle at a first pivot coupling, and a second end for coupling to the chassis of the vehicle at a second pivot coupling, and an axle coupler portion arranged intermediate of the first and second ends. Additionally, there is provided a secondary leaf spring having a plan view longitudinal configuration, a first end for pivotally coupling to the chassis of the vehicle at a pivot coupling, and a second end for coupling to the longitudinal axle. There is advantageously provided a deflection limiting element coupled to a selectable one of the primary and secondary leaf springs for controlling a distance therebetween. The plan view longitudinal configuration of the secondary leaf spring is arranged at a predetermined angular displacement with respect to the chassis rail, which in some embodiments of the invention may be substantially parallel thereto.

In one embodiment of this aspect of the invention, there is optionally provided a principal resilient element illustratively in the form of a spring having a predetermined resilience characteristic. The optional principal resilient element is, in one embodiment, a spring having a first portion for coupling to the chassis of the vehicle at a primary coupling, and a second portion for coupling to the longitudinal axle said principal spring and the second end of said secondary leaf spring each communicate with respective portions of the longitudinal axle at respective longitudinal regions of the longitudinal axle. The principal spring is, in one embodiment of the invention, an air-assisted resilient element. In other embodiments, the principal spring is a coil spring.

In one embodiment of the invention, the deflection-limiting element is a J-shaped spring element. It is to be understood, however, that other configurations, such as an L-shaped spring element; a C-shaped spring element; a pillar, or I-shaped spring element; a closed, or O-shaped spring element; a U-shaped spring element; or any other suitable configuration. In this disclosure, the term "J-shaped spring element" shall be deemed to encompass all such alternative embodiments and equivalents thereof.

In some embodiments, the plan view longitudinal configuration of the secondary leaf spring is arranged at an angle with respect to the chassis rail of the vehicle, the second end of the secondary leaf spring being arranged to communicate with a respective portion of the longitudinal axle that is axially displaced along the longitudinal axle relative to the respective portion thereof that is engaged with the air assisted primary spring.

In accordance with a further apparatus aspect of the invention, there is provided a vehicle suspension arrangement for a vehicle of the type having a chassis rail and a longitudinal axle arranged substantially orthogonal to the chassis rail. A principal resilient element has a determinable resilience characteristic, the principal resilient element having a first portion for coupling to the chassis of the vehicle and a second portion for coupling to the longitudinal axle. A secondary leaf spring is provided having a plan view longitudinal configuration, a first end for pivotally coupling to the chassis of the vehicle at a secondary pivot coupling, and a second end for coupling to the longitudinal axle. Additionally, there is provided a deflection limiting element coupled to the secondary leaf spring for limiting the extent of a leaf spring deflection.

In an embodiment of the invention where the principal resilient element is an air-pressure-assisted primary spring, such an air spring has a resilience characteristic that is responsive to air pressure, a first portion for coupling to the chassis of the vehicle at a primary coupling, and a second portion for coupling to the longitudinal axle. In other embodiments, the principal resilient element is a coil spring.

In one embodiment of this further apparatus aspect of the invention, there is provided a pivot coupling arrangement disposed intermediate of the second portion of the secondary leaf spring and the longitudinal axle.

In a further embodiment of the invention, there is provided a primary leaf spring having a plan view longitudinal configuration, the first portion being a first end for pivotally coupling to the chassis rail of the vehicle at a first primary pivot coupling, and there is also provided a further end distal from the first end for pivotally coupling to the chassis rail of the vehicle at a second primary pivot coupling. The second portion for coupling to the longitudinal axle is arranged intermediate of the first an further ends of the primary leaf spring. The primary leaf spring is arranged to communicate with the deflection limiting element.

In a highly advantageous embodiment of the invention, a pivot coupling arrangement is disposed intermediate of the second portion of the primary leaf spring and the longitudinal axle.

In a further embodiment, the secondary leaf spring is arranged to be angularly displaced with respect to the primary leaf spring. The first primary pivot coupling and the secondary pivot coupling are, in some embodiments, arranged to be substantially coplanar.

In accordance with a further apparatus aspect of the invention, there is provided a suspension arrangement for a vehicle having a leaf spring element having a substantially longitudinal configuration, and a deflection limiting element coupled to the leaf spring element.

There is further provided in some embodiments a further leaf spring element for constituting a dual leaf suspension arrangement in combination with the leaf spring element, the leaf spring element being disposed whereby the deflection limiting element is intermediate of the leaf spring element and the further leaf spring element.

In a highly advantageous embodiment, the deflection limiting element comprises a J-shaped spring element that is coupled to one of the leaf spring elements. In some embodiments, there is further provided a resilient contact element attached to the J-shaped spring element for communicating with the other leaf spring element.

In accordance with a method aspect of the invention, there is provided a method of controlling a ride characteristic of a vehicle of the type that is provided with a dual leaf suspension having first and second leaf elements. The method includes the step of limiting the distance between the first and second leaf elements. In this manner, excessive deflection of one of the leaf spring elements, as might result from braking or acceleration, and that would illustratively decrease the distance between the first and second leaf elements, is precluded.

In one embodiment of this method aspect of the invention, the step of limiting the distance between the first and second leaf elements includes the step of interposing a deflection limiting element between the first and second leaf elements, hi some embodiments, the deflection limiting element is a J-shaped spring element that is coupled to one of the first and second leaf elements.

In other embodiments of this method aspect of the invention, there is further provided the step of providing a principal resilient element in combination with the first and second leaf elements.

BRIEF DESCRIPTION OF THE DRAWINGS

Comprehension of the invention is facilitated by reading the following detailed description, in conjunction with the annexed drawing, in which:

FIGS. 6(a) and 6(b) are simplified schematic representations that illustrate the stresses that result from leaf spring wind-up (FIG. 6(a)) without the J-shaped spring element, and the beneficial effect that is achieved when the J-shaped spring element is employed (FIG. 6(b)).

DETAILED DESCRIPTION

Figure 1:
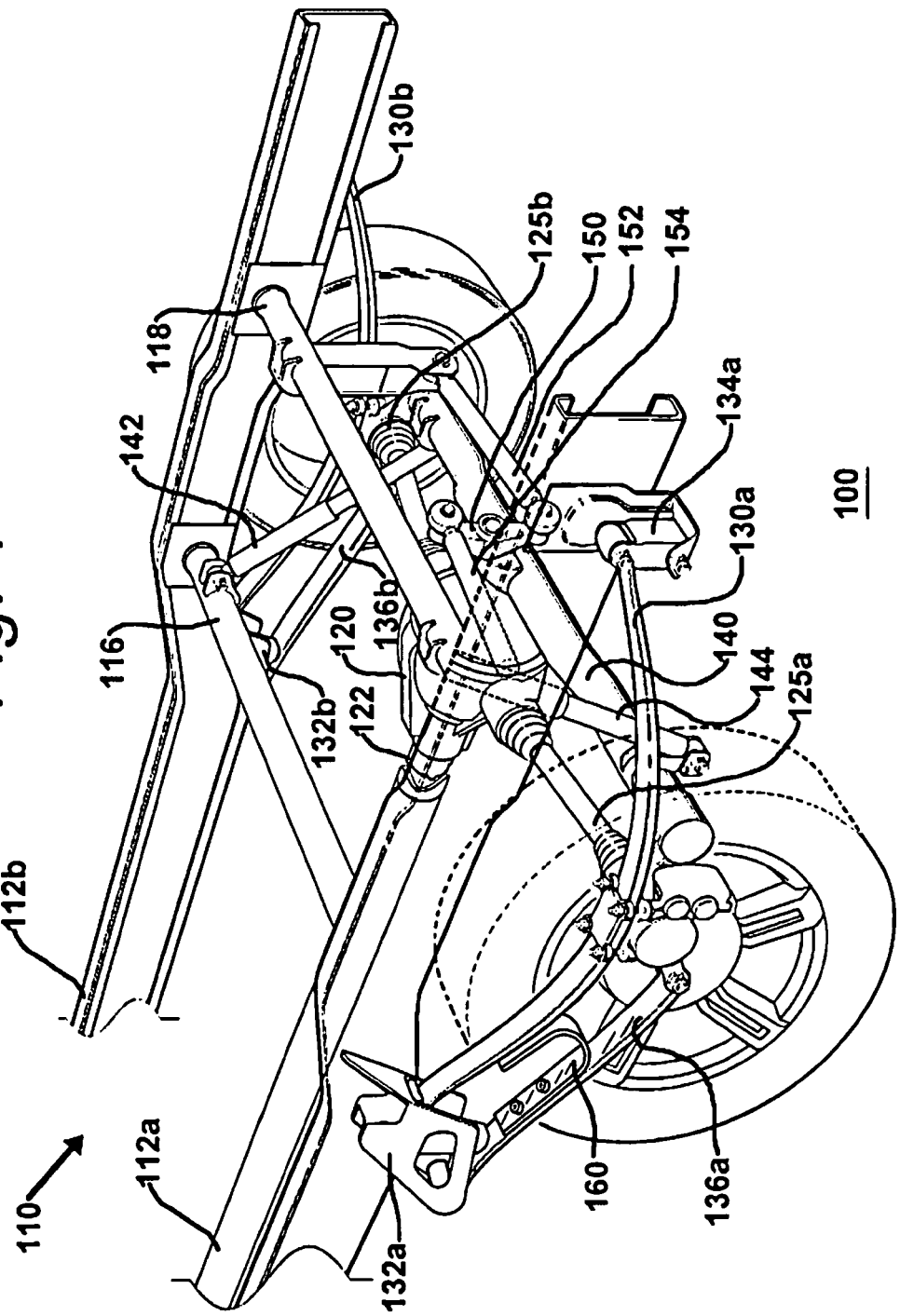
FIG. 1 is a perspective representation of a specific illustrative embodiment of the invention.

FIG. 1 is a perspective representation of a specific illustrative embodiment of the invention. As shown in this figure, a vehicle suspension system 100 has a chassis that is generally designated as chassis 110. The chassis has a pair of substantially parallel chassis rails 112a and 112b that are coupled to one another by cross-braces 116 and 118.

A differential drive arrangement 120 is fixedly coupled to the chassis and converts the rotary motion of a drive shaft 122 to substantially orthogonal rotatory motion at half shafts 125a and 125b. Each half shaft has an associated pair of universal joints (not specifically designated) that are arranged to be proximal and distal with respect to the differential drive arrangement. Thus, the half shafts, each of which has an associated longitudinal axis (not shown), accommodate transaxial motion, particularly by operation of the proximal universal joints.

Half shafts 125a and 125b are shown to be coupled at their distal ends to respective leaf springs 130a and 130b. Referring to leaf spring 130a, for example, the leaf spring is, in this specific illustrative embodiment of the invention, pivotally coupled at its forward end to a bracket 132a. At its rearward end, leaf spring 130a is pivotally coupled to a link 134a. As shown in this figure, there is additionally provided a half leaf spring 136a that is also, in this specific illustrative embodiment of the invention, coupled at its forward end to bracket 132a. At its rearward end, half leaf spring 136a is coupled to the distal end of half shaft 125a. Half leaf spring 136a is shown in this specific illustrative embodiment of the invention, to engage a fulcrum 133a.

In this embodiment of the invention, there is attached to half leaf spring 136a a J-shaped spring element 160. J-shaped spring element 160 is, in this specific illustrative embodiment of the invention, coupled to half leaf spring 136a by two fasteners (not specifically designated in this figure). J-shaped spring element 160, additional elements of structure related thereto, such as an elastomeric fulcrum element (not shown in this figure) disposed between the J-shaped spring element and leaf spring 130a, and its kinematic and other effects on the characteristics of half leaf spring 136a and leaf spring 130a, will be described in greater detail below. A further J-shaped spring element is, in the practice of the invention, installed on half leaf spring 136b. However, the further J-shaped spring element on half leaf spring 136b is not shown in this figure for sake of clarity of the figure.

There is additionally shown in this figure a transverse beam 140 that is coupled to cross-brace 116 by a damper 142 and to cross-brace 118 by a further damper 144. Transverse beam 140 has installed thereon a pivoting member 150 to which are attached link elements 152 and 154. The link elements are attached, via brackets (not specifically designated), to cross-brace 118.

It is to be understood that the inventive J-shaped spring element 160 described herein is not limited in its application to the specific suspension arrangement represented in FIG. 1. Persons of skill in the art, in light of the teaching herein, will be able to generate additional embodiments of the J-shaped spring element as required to be accommodated within other vehicle suspension arrangements. Such additional embodiments may include, for example, a J-shaped spring element that more closely resemble an L-shaped spring element, as shown in the schematic representation of FIG. 6(b); a C-shaped spring element (not shown); a pillar, or I-shaped spring element (not shown); a closed, or O-shaped spring element (not shown); a U-shaped spring element (not shown); or the like. However, for purposes of the description of the invention herein presented, the term "J-shaped spring element" shall be deemed to encompass all such alternative embodiments and equivalents thereof.

Figure 2:
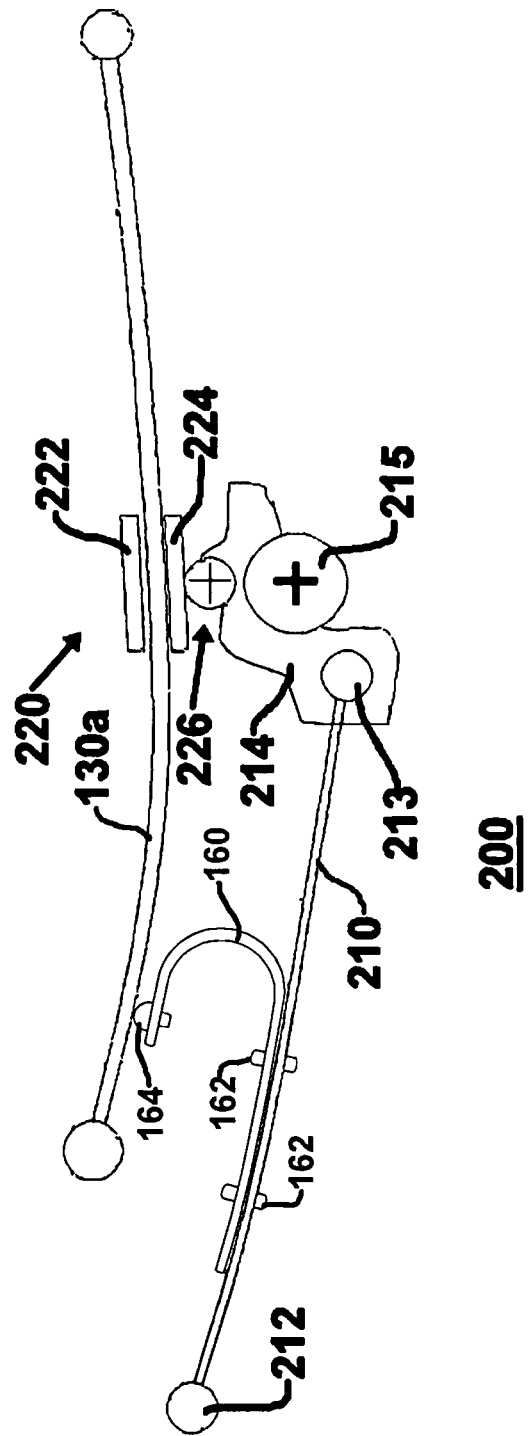
FIG. 2 is a side plan simplified schematic illustrations of a rotary joint suspension arrangement and a J-shaped spring element constructed in accordance with the principles of the invention.

FIG. 2 is a side plan simplified schematic illustrations of a rotaryjoint suspension arrangement 200 and further having J-shaped spring element 160 constructed in accordance with the principles of the invention. Elements of structure that bear analogous correspondence to elements of structure that have previously been discussed are similarly designated in this figure. Referring to FIG. 2, it is seen that there is provided a leaf spring 130a that, in this specific illustrative embodiment of the invention, is pivotally coupled at its forward and rear ends, as previously described. There is additionally provided a half leaf spring 210 that is also, in this specific illustrative embodiment of the invention, pivotally coupled at a pivot mount 212 at its end distal to a further pivotal mounting 213 at a coupling member 214. The coupling member is itself coupled to axle shaft 215.

FIG. 2 further illustrates a pivot link mounting arrangement 220 wherein leaf spring 130a is securely clamped between clamping member 222 and 224. Clamping member 224 is coupled to a pivot joint 226 that is itself engaged with coupling 214. This arrangement permits a further degree of motion that reduce system internal loading on the pivot joint arrangement and leaf spring elements.

In accordance with the invention, there is provided J-shaped spring element 160 coupled to half leaf spring 210 by means of fasteners 162. J-shaped spring element has a fulcrum element 164 formed, in this specific illustrative embodiment of the invention, of an elastomeric material. Fulcrum element 164, as will be described below, communicates with leaf spring 130a to effect an advantageous change in the overall spring characteristic of the vehicle suspension.

Figure 3:
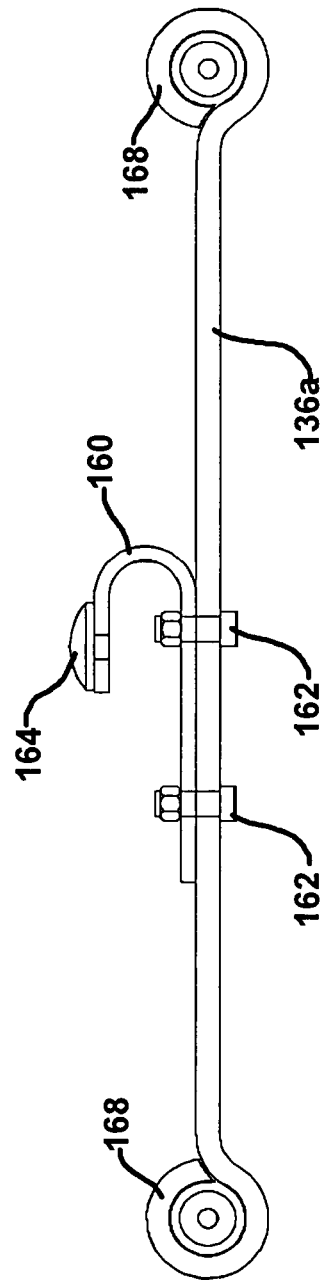
FIG. 3 is a simplified lateral plan representation of the half leaf spring with the J-shaped spring element attached thereto.

FIG. 3 is a simplified lateral plan representation of the half leaf spring with the J-shaped spring element attached thereto. Elements of structure that have previously been discussed are similarly designated. As shown in this figure, J-shaped spring element 160 coupled to half leaf spring 210 by means of fasteners 162. The J-shaped spring element has installed thereon a fulcrum element 164 formed, for example, of an elastomeric material. J-shaped spring element 160 has at each of its ends, terminations 168 that facilitate pivotal coupling of the J-shaped spring element to the chassis (not shown in this figure) and the axle (not shown in this figure) in a conventional manner.

Figure 4:
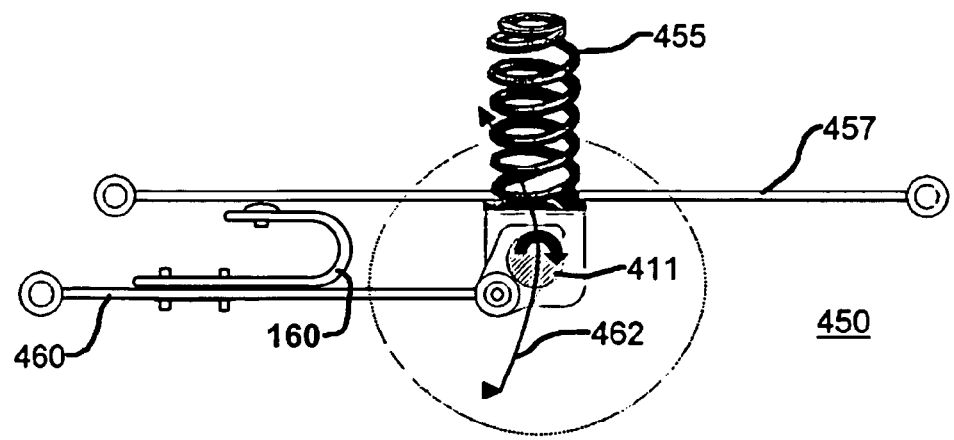
FIG. 4 is a simplified schematic representation of a side view of a suspension system constructed in accordance with the principles of the invention with a 1st stage consisting of a coil spring.

FIG. 4 is a simplified schematic representation of a side view of a suspension system constructed in accordance with the principles of the invention with a 1st stage consisting of a coil spring. Elements of structure that have previously been discussed are similarly designated. Coil spring 455 provides vertical load support in combination with first stage leaf spring 457. A lower leaf 460 of the 2nd stage is employed for additional control. In this specific illustrative embodiment of the invention, the center of axle 411 travels along a path that conforms to curved arrow 462, as seen in the present side view. In accordance with the invention, J-shaped spring element 160 is shown to be coupled to lower leaf 460 by means of fasteners (not specifically designated in this figure). As previously noted, in other embodiments of the invention the J-shaped spring element is coupled to first stage leaf spring 457, such other embodiments not being shown.

Figure 5:
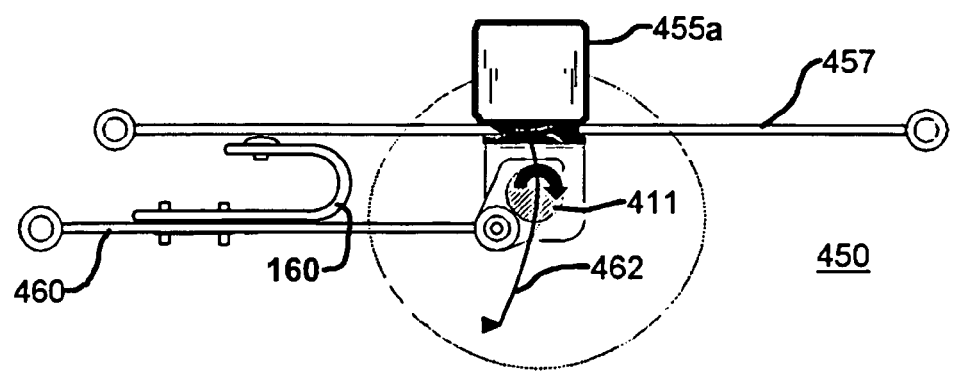
FIG. 5 is a simplified schematic representation of a side view of a suspension system constructed in accordance with the principles of the invention with a 1st stage consisting of an air-pressure responsive resilient element in the form of an air spring.

FIG. 5 is a simplified schematic representation of a side view of a suspension system constructed in accordance with the principles of the invention with a 1st stage consisting of an air-pressure responsive resilient element in the form of an air spring 455a. Elements of structure that have previously been discussed are similarly designated. Air spring 455a provides vertical load support in combination with first stage leaf spring 457. As described above in relation to FIG. 4, lower leaf 460 of the 2nd stage is employed for additional control.

Center of axle 411 travels along a path that conforms to curved arrow 462, as seen in the present side view. In accordance with the invention, J-shaped spring element 160 is shown to be coupled to lower leaf 460 by means of fasteners (not specifically designated in this figure).

FIGS. 6(a) and 6(b) are simplified schematic representations that illustrate the stresses that result from leaf spring wind-up (FIG. 6(a)) without the J-shaped spring element, and the beneficial effect that is achieved when the J-shaped spring element is employed (FIG. 6(b)). The schematic representations of these figures represent computer models of the stresses applied in an embodiment of the invention installed on a Chrysler heavy duty truck (3500 series). As shown in FIG. 6(a), there is not provided a J-shaped spring element, and the resulting wind-up of the primary leaf spring results in a stress applied that exceeds 1700 MPa. The rotational displacement resulting from this wind-up stress is on the order of 18.43 [deg.], which translates into a stiffness parameter of approximately 34.5 Nm/degree.

FIG. 6(b) illustrates computer-modeled stresses that are applied to the leaf spring elements when the J-shaped spring element is employed (shaped substantially as an L-shaped spring element). As shown, the primary spring experiences a range of stresses from less than 700 MPa to approximately 660.85 MPa. Thus, the stress is reduced considerable by implementation of the J-shaped spring element. In addition, it is noted that the rotational displacement resulting from this wind-up stress is on the order of 4.40 [deg.], which translates into a stiffness parameter of approximately 152 Nm/degree. This equates to an increase in stiffness by a factor of 4.41, without significant increase in unsprung mass.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

What is claimed is:

1. A vehicle suspension arrangement for a vehicle of the type having a chassis rail and a longitudinal axle arranged substantially orthogonal to the chassis rail, the vehicle suspension arrangement comprising:
 a primary leaf spring having a plan view longitudinal configuration, a first end for pivotally coupling to the chassis of the vehicle at a first pivot coupling, and a second end for coupling to the chassis of the vehicle at a second pivot coupling, and a coupler portion arranged intermediate of the first and second ends;
 a secondary leaf spring having a plan view longitudinal configuration, a first end for pivotally coupling to the chassis of the vehicle at a pivot coupling, and a second end for coupling to the longitudinal axle; and
 a deflection limiting element coupled to a selectable one of said primary and secondary leaf springs for controlling a distance therebetween, the deflection limiting element disposed at an intermediate location relative to the first end and the second end of the secondary leaf spring.

2. The vehicle suspension arrangement of claim 1, wherein there is further provided a principal spring having a predetermined resilience characteristic, a first portion for coupling to the chassis of the vehicle at a primary coupling, and a second portion for coupling to the longitudinal axle said principal spring and the second end of said secondary leaf spring each communicate with respective portions of the longitudinal axle at respective longitudinal regions of the longitudinal axle.

3. The vehicle suspension arrangement of claim 2, wherein said principal spring is an air-assisted resilient element.

4. The vehicle suspension arrangement of claim 2, wherein said principal spring is a coil spring.

5. The vehicle suspension arrangement of claim 1, wherein said deflection limiting element comprises a J-shaped spring element.

6. The vehicle suspension arrangement of claim 1, wherein the plan view longitudinal configuration of said secondary leaf spring is arranged substantially parallel to the chassis rail of the vehicle.

7. A vehicle suspension arrangement for a vehicle of the type having a chassis rail and a longitudinal axle arranged substantially orthogonal to the chassis rail, the vehicle suspension arrangement comprising:
 a principal resilient element having a determinable resilience characteristic, said principal resilient element having a first portion for coupling to the chassis of the vehicle and a second portion for coupling to the longitudinal axle;
 a secondary leaf spring having a plan view longitudinal configuration, a first end for pivotally coupling to the chassis of the vehicle at a secondary pivot coupling, and a second end for coupling to the longitudinal axle; and
 a deflection limiting element coupled to said secondary leaf spring for limiting the extent of a leaf spring deflection, the deflection limiting element comprising a J-shaped spring element.

8. The vehicle suspension arrangement of claim 7, wherein there is further provided a pivot coupling arrangement disposed intermediate of the second portion of said secondary leaf spring and the longitudinal axle.

9. The vehicle suspension arrangement of claim 7, wherein there is further provided a primary leaf spring having a plan view longitudinal configuration, a first end for pivotally coupling to the chassis of the vehicle at a first pivot coupling, and a second end for coupling to the chassis of the vehicle at a second pivot coupling, and a coupler portion arranged intermediate of the first and second ends, said primary leaf spring being arranged to communicate with said deflection limiting element.

10. The vehicle suspension arrangement of claim 9, wherein said secondary leaf spring is arranged to be substantially parallel in relation to said primary leaf spring.

11. The vehicle suspension arrangement of claim 7, wherein said principal resilient element is a coil spring.

12. The vehicle suspension arrangement of claim 7, wherein said principal resilient element is an air-pressure-responsive resilient element.

13. A method of controlling a ride characteristic of a vehicle having a dual leaf suspension with first and second leaf elements, the method comprising the step of limiting the distance between the first and second leaf elements with a J-shaped deflection limiting element disposed between the first and second leaf elements the deflection limiting element coupled to one of the first and second leaf elements at an intermediate location relative to a first end and a second end of the second leaf element.

14. The method of claim 13, wherein there is further provided the step of providing a principal resilient element in combination with the first and second leaf elements.

* * * * *